US008442815B2

(12) United States Patent
Okada et al.

(10) Patent No.: US 8,442,815 B2
(45) Date of Patent: May 14, 2013

(54) ADAPTIVE RECOGNITION DICTIONARY UPDATE APPARATUS FOR USE IN MOBILE UNIT WITH A TUNER

(75) Inventors: Reiko Okada, Tokyo (JP); Tadashi Suzuki, Tokyo (JP); Yuzo Maruta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1401 days.

(21) Appl. No.: 11/919,349

(22) PCT Filed: Apr. 4, 2006

(86) PCT No.: PCT/JP2006/307124
§ 371 (c)(1),
(2), (4) Date: Oct. 26, 2007

(87) PCT Pub. No.: WO2007/000846
PCT Pub. Date: Jan. 4, 2007

(65) Prior Publication Data
US 2009/0313008 A1   Dec. 17, 2009

(30) Foreign Application Priority Data
Jun. 29, 2005 (JP) ................................. 2005-190076

(51) Int. Cl.
*G06F 17/21* (2006.01)
*G10L 15/00* (2006.01)
*G10L 21/00* (2006.01)

(52) U.S. Cl.
USPC ............................... 704/10; 704/275; 704/231

(58) Field of Classification Search .................... None
See application file for complete search history.

(56) References Cited

U.S. PATENT DOCUMENTS

| 4,796,191 | A  | * | 1/1989 | Honey et al. ................... 701/217 |
| 5,722,053 | A  | * | 2/1998 | Kornfeld et al. ................ 455/86 |
| 6,246,672 | B1 | * | 6/2001 | Lumelsky ....................... 370/310 |
| 6,397,060 | B1 | * | 5/2002 | Oikawa .......................... 455/420 |

(Continued)

FOREIGN PATENT DOCUMENTS

| DE | 600 06 524 T2 | 6/2004 |
| JP | 9-55642 A | 2/1997 |

(Continued)

*Primary Examiner* — Jesse Pullias
(74) *Attorney, Agent, or Firm* — Birch, Steward, Kolasch & Birch, LLP (57) ABSTRACT

An information apparatus for use in mobile unit, which is mounted on a mobile unit, includes a broadcast receiver receiving a signal containing a station name; a recognition dictionary registering the station name; and a recognition section that, referring to the dictionary, tunes to the station associated with the station name. The apparatus further includes a recognition dictionary update section updating the dictionary in response to signal reception; and a dictionary update deciding section that decides, based on the update mode of the dictionary during updating, if any change occurs between the station transmitting the signal and the update mode, and alters, if change occurs, an update frequency of the dictionary by the dictionary update section in response to a traveling condition of the mobile unit or to a receiving condition of the signal.

13 Claims, 10 Drawing Sheets

U.S. PATENT DOCUMENTS

| | | | |
|---|---|---|---|
| 6,470,178 B1 * | 10/2002 | Cummings-Hill et al. | 455/186.1 |
| 6,721,536 B1 * | 4/2004 | Shimazu | 455/3.02 |
| 6,839,670 B1 * | 1/2005 | Stammler et al. | 704/251 |
| 6,876,970 B1 * | 4/2005 | Silver et al. | 704/275 |
| 6,957,053 B1 | 10/2005 | Moers | |
| 2002/0046084 A1 * | 4/2002 | Steele et al. | 705/14 |
| 2003/0040272 A1 * | 2/2003 | Lelievre et al. | 455/3.06 |
| 2003/0088399 A1 * | 5/2003 | Kusumoto | 704/10 |
| 2005/0102148 A1 | 5/2005 | Rogitz | |

FOREIGN PATENT DOCUMENTS

| | | |
|---|---|---|
| JP | 11-304902 A | 11/1999 |
| JP | 2001-86014 A | 3/2001 |
| JP | 2002-118478 A | 4/2002 |
| JP | 2003-219201 A | 7/2003 |
| JP | 2003-223183 A | 8/2003 |

* cited by examiner

FIG.2

| Station Name | Station Name A |
|---|---|
| Update Mode | Addition/deletion |
| Update Time | 10:32:25, 3/25/2005 |
| Point | Lat. xxxxxN. And Long. xxxxxE. |
| Field Strength | 50 dB |

FIG.3

| Traveling Speed | 100 Km/h |
|---|---|
| Traveled Distance | 500 M |
| Time | 30 Sec |

ADAPTIVE RECOGNITION DICTIONARY UPDATE APPARATUS FOR USE IN MOBILE UNIT WITH A TUNER

TECHNICAL FIELD

The present invention relates to an information apparatus for use in mobile unit, which is mounted on a mobile unit such as a vehicle and has a broadcast receiver for receiving radio and/or television broadcasting, and more particularly to an information apparatus for use in mobile unit with a function of tuning to a broadcasting station based on voice recognition.

BACKGROUND ART

Generally, a mobile unit such as a vehicle is equipped with a broadcast receiver for receiving radio and/or television broadcasting. The broadcast receiver is sometimes equipped with an information apparatus for use in mobile unit (onboard information apparatus), which detects the current position of the vehicle with a navigation system like GPS (Global Positioning System), and displays it on a display unit with a road map as the current vehicle location.

To receive a desired broadcasting station with a broadcast receiver, a user carries out tuning by manipulating the operation section such as a tuning button. The tuning operation during driving, however, is not only troublesome, but may involve danger. On the other hand, broadcast receivers are known which perform tuning using voice recognition. For example, a broadcast receiver is known which is provided with a dictionary of broadcasting station names of the whole country in advance. When a user utters a phrase common to the broadcasting station names, it searches the dictionary, recognizes a plurality of broadcasting stations, and selects a signal currently receivable at a fixed or higher level from the broadcast waves of the broadcasting stations recognized.

In addition, a broadcast receiver is known which carries out tuning using voice recognition to receive a desired broadcasting station, and which automatically creates a necessary and sufficient dictionary for the dwelling place of the user. It is equipped with a receiving channel table including words for representing receiving channels, and automatically creates a necessary and sufficient dictionary matching the dwelling place of the user to prevent the problem of the tuning position. More specifically, the broadcast receiver is provided not only with a receiving channel table including words for representing receiving channels, but also with a channel setting information storing section for storing tuning positions and receiving channels with establishing correspondence between them. When a new receiving channel is assigned to the tuning position by registering in the dictionary the word representing the receiving channel assigned to the tuning position, the broadcast receiver searches the receiving channel table for the word representing the receiving channel newly assigned to the tuning position, updates the word in the dictionary, and receives and outputs the signal of the receiving channel in accordance with the voice recognition result. Thus, the broadcast receiver automatically creates a table that assigns a plurality of abbreviations representing a broadcasting station to the receiving channel of the single broadcasting station whose broadcast area is the dwelling area of the user (see Patent Document 1, for example).

The broadcast receiver described in Patent Document 1 is a fixedly placed receiver. Thus, even if it has automatically created the necessary and sufficient dictionary matching the dwelling place of the user as described in Patent Document 1, when receivable broadcasting stations vary with the movement of the vehicle as the broadcast receiver equipped in the onboard information apparatus, the dictionary automatically created for the dwelling place of the user cannot be used.

In view of this, the onboard information apparatus dynamically changes the dictionary in accordance with the traveling of the vehicle. For example, it obtains broadcasting station names from broadcasting signals (broadcast waves) received, and updates the dictionary in accordance with the broadcasting station names. In other words, it must update the dictionary in such a manner as to add a broadcasting station name newly to the dictionary when receiving a broadcasting station not registered in the dictionary, and to deleted a broadcasting station that becomes unreceivable from the dictionary.

Patent Document 1: Japanese patent laid-open No. 2003-223183 (pp. 8-10, and FIGS. 1-9).

With the foregoing configuration, if the update of the dictionary is carried out each time the receivable broadcasting stations vary frequently depending on traveling conditions of the vehicle or receiving conditions, the conventional onboard information apparatus cannot help increasing the load on a microcomputer because of the frequent update of the dictionary. Then, if other applications (such as navigation) are executed, as is the case of the onboard information apparatus, an excessive burden is imposed on the microcomputer, offering a problem of making the operation of the onboard information apparatus unstable.

The present invention is implemented to solve the foregoing problems. Therefore it is an object of the present invention to provide a mobile unit information apparatus capable of carrying out stable operation by reducing the dictionary update frequency and the burden on the microcomputer in spite of the frequent changes of the receivable broadcasting stations.

DISCLOSURE OF THE INVENTION

An information apparatus for use in mobile unit in accordance with the present invention includes a broadcast receiver mounted on a mobile unit for receiving a broadcasting signal containing at least a broadcasting station name, a dictionary registering the broadcasting station name, and a voice recognition section for performing voice recognition of a voice input indicating the broadcasting station name; and carries out, referring to the dictionary, tuning to the broadcasting station associated with the broadcasting station name corresponding to a voice recognition result. In addition, the information apparatus for use in mobile unit includes a dictionary update section for updating the dictionary in response to reception of the broadcasting signal; and a dictionary update deciding section for making a decision, referring to an update mode at the update of the dictionary when receiving the broadcasting signal, as to whether any change occurs between the broadcasting station transmitting the broadcasting signal and the update mode or not, and for altering, if any change occurs, an update frequency of the dictionary by the dictionary update section in response to a traveling condition of the mobile unit or to a receiving condition of the broadcasting signal.

According to the present invention, the information apparatus is configured in such a manner as to make a decision, referring to an update mode at the update of the dictionary when receiving the broadcasting signal, as to whether any change occurs between the broadcasting station transmitting the broadcasting signal and the update mode or not, and for altering, if any change occurs, an update frequency of the dictionary in response to the traveling condition of the mobile unit or to the receiving condition of the broadcasting signal.

Accordingly, it offers an advantage of being able to implement stable operation by reducing the load on a microcomputer.

BEST MODE FOR CARRYING OUT THE INVENTION

The best mode for carrying out the invention will now be described with reference to the accompanying drawings to explain the present invention in more detail.

Embodiment 1

Figure 1:
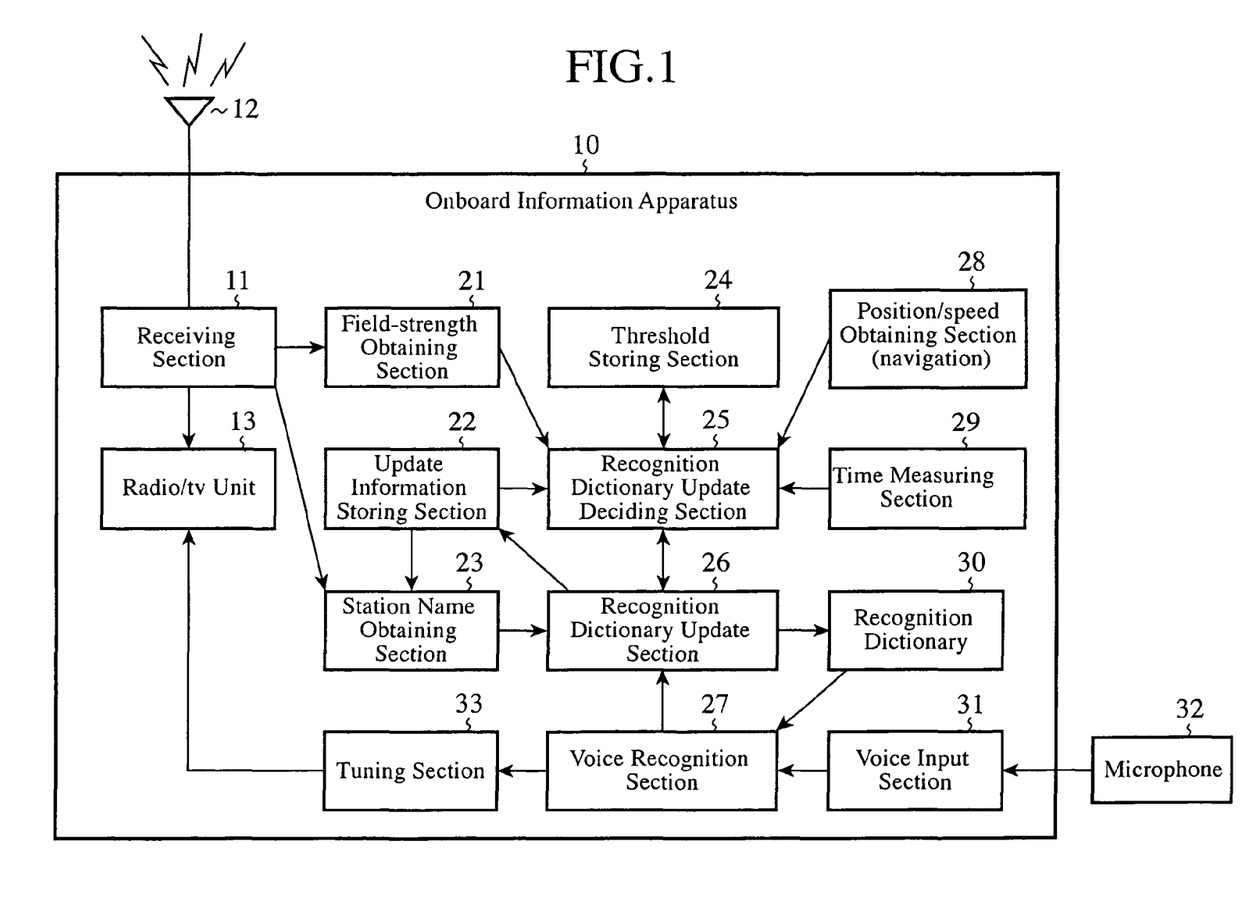
FIG. 1 is a block diagram showing a configuration of an onboard information apparatus of an embodiment 1 in accordance with the present invention.

FIG. 1 shows the onboard information apparatus of an embodiment 1 in accordance with the present invention. The onboard information apparatus 10 shown in FIG. 1 is installed in a mobile unit such as a vehicle, and carries out tuning in response to a result of recognizing the voice input at the tuning. The onboard information apparatus 10 includes a receiving section 11 that selectively receives a radio broadcast wave or a television (TV) broadcast wave via an antenna 12, and supplies it to a radio/TV unit 13 as a radio/TV broadcast. In the example of FIG. 1, the radio/TV broadcast is digital broadcasting, and hence the radio/TV broadcast is simply referred to as digital broadcasting.

In the digital broadcasting, to broadcast the same affiliated broadcast in a plurality of areas (called "broadcast areas"), each broadcast area has a broadcasting station that transmits digital broadcast waves (in the digital broadcasting, an OFDM (Orthogonal Frequency Division Multiplexing) scheme is used, for example). Accordingly, when receiving the digital broadcast waves with the receiver mounted on the vehicle, the receivable broadcasting station varies as the areas (that is, the broadcast areas) vary in accordance with the movement of the vehicle. Thus, it is necessary to retune to the new broadcasting station every time it varies.

On the other hand, the digital broadcast wave includes a digital video signal (in the case of TV), a digital audio signal, and service information (Service_Information: SI information). The SI information includes data indicating items such as a transmission channel (transmission frequency), a transmission station name, a broadcast target area (broadcast area), and a broadcasting program.

The onboard information apparatus 10 includes a field-strength obtaining section 21, an update information storing section 22, a station name obtaining section 23, a threshold storing section 24, a recognition dictionary update deciding section 25, a recognition dictionary update section 26, a voice recognition section 27, a position/speed obtaining section (navigation system) 28, a time measuring section 29, a recognition dictionary 30, and a voice input section 31 to which a microphone 32 is connected.

The received field-strength obtaining section 21 acquires the received field strength associated with the digital broadcast wave when receiving the digital broadcast wave with the receiving section 11. The station name obtaining section 23 acquires the broadcasting station name included in the digital broadcast wave when receiving the digital broadcast wave with the receiving section 11. On the other hand, the voice input via the microphone 32 undergoes analog/digital (A/D) conversion through the voice input section 31, and is supplied to the voice recognition section 27 that carries out voice recognition using the recognition dictionary 30. When the broadcasting station input in a voice from the microphone 32 is found in the recognition dictionary, the voice recognition section 27 provides the broadcasting station to the tuning section 33. Thus, the tuning section 33 tunes to the broadcasting station by controlling the radio/TV unit 13.

The broadcasting station name is delivered from the station name obtaining section 23 to the recognition dictionary update section 26. The recognition dictionary update section 26 updates the recognition dictionary 30 in accordance with the broadcasting station name and the voice recognition result by the voice recognition section 27 in such a manner as will be described later, and stores an update history (such as electric field strength, distance information and time information) at the time of updating the recognition dictionary 30 into the update information storing section 22.

Figure 2:
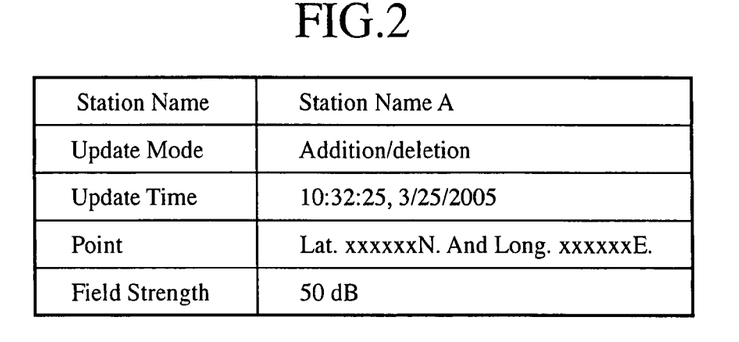
FIG. 2 is a table showing an example of update information (update history) stored in an update information storing section shown in FIG. 1.

FIG. 2 is a table showing an example of the update history stored in the update information storing section 22. As the update history, are stored the broadcasting station name, update mode (addition/deletion), update time (date and time), position (latitude and longitude), and electric field strength.

The field-strength obtaining section 21 delivers the received field strength to the recognition dictionary update deciding section 25. The position/speed obtaining section 28 acquires the current location and traveling speed of the vehicle, and supplies them to the recognition dictionary update deciding section 25 as the distance information. The time measuring section 12 measures the time (date and time), and supplies it to the recognition dictionary update deciding section 25 as the time information. According to the received field strength, the distance information, the time information, and the threshold stored in the threshold storing section 24, the recognition dictionary update deciding section 25 makes a decision whether to update the recognition dictionary 30 in a manner as will be described later, and supplies the decision result to the recognition dictionary update section 28. The recognition dictionary update section 28 carries out the update processing of the recognition dictionary 30 according to the decision result.

Figure 3:
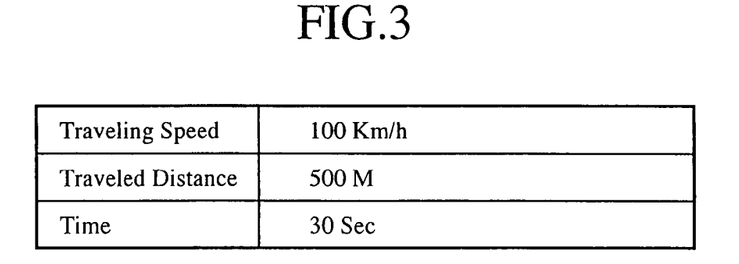
FIG. 3 is a table showing an example of various thresholds stored in a threshold storing section shown in FIG. 1.
Figure 4:
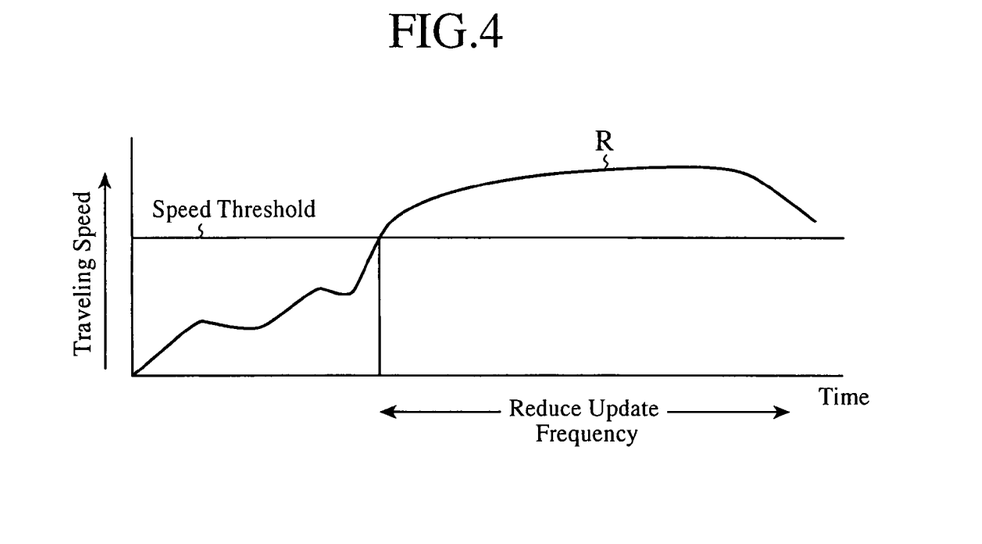
FIG. 4 is a diagram illustrating relationships between a traveling speed and a traveling threshold and an update frequency in the onboard information apparatus shown in FIG. 1.

FIG. 3 is a table showing an example of the thresholds stored in the threshold storing section 24. Here, as the thresholds are set the traveling speed (speed threshold), the traveled distance (distance threshold), the time period (time period threshold), and a field-strength threshold (which is not shown in FIG. 3). When the traveling speed R of the vehicle varies with time as illustrated in FIG. 4, as the traveling speed increases, the received field strength will vary in a shorter time in general. Thus, when the traveling speed is greater than the speed threshold, the update frequency of the recognition dictionary 30 is reduced in a manner as will be described later.

Next, the operation will be described.

Figure 5:
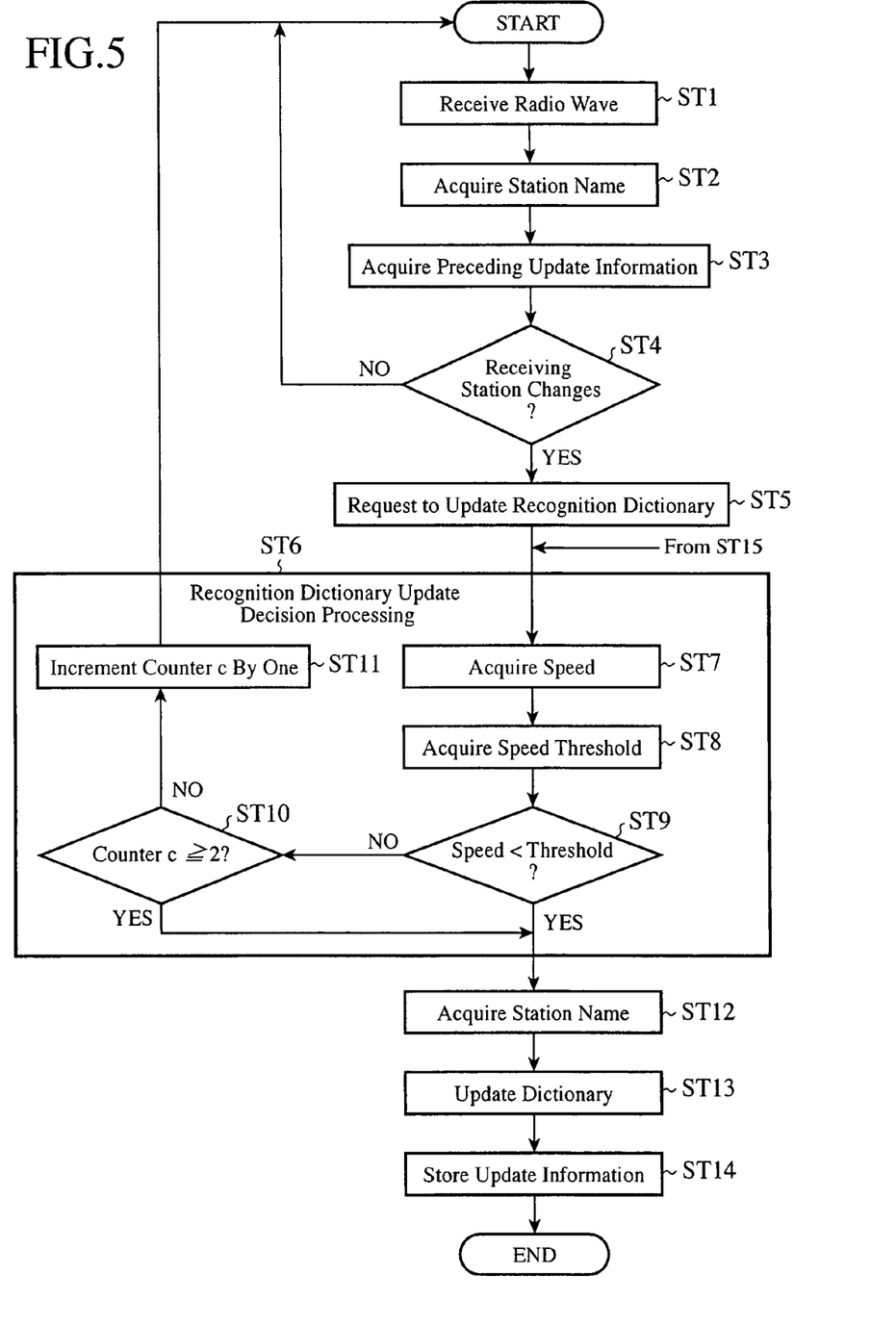
FIG. 5 is a flowchart illustrating the operation of the onboard information apparatus of the embodiment 1 in accordance with the present invention.

Referring to FIG. 1 and FIG. 5, assume that the receiving section 11 receives a receivable digital broadcast. The field-strength obtaining section 21 acquires the received field strength of the receivable digital broadcast wave (radio wave reception: step ST1). On the other hand, the station name obtaining section 23 acquires the broadcasting station name from the receivable digital broadcast wave (step ST2). The recognition dictionary update deciding section 25 acquires the broadcasting station name information updated previously (update information acquisition: step ST3) from the update information storing section 22 with reference to the update information, and decides as to whether any broadcasting station is present which becomes unreceivable because some change occurs between the updated broadcasting station and the receivable broadcasting station (whether any change occurs about the receiving broadcasting station: step ST4).

At step ST4, unless any change occurs as to the receiving broadcasting station, the processing returns to step ST1. In contrast, if any change occurs about the receiving broadcasting station, the recognition dictionary update deciding section 25 requests the recognition dictionary update section 26 to update the recognition dictionary 30 (step ST5). Receiving the recognition dictionary update request, the recognition dictionary update section 26 requests the recognition dictionary update deciding section 25 to make the decision, and the recognition dictionary update deciding section 25 proceeds to the recognition dictionary update decision processing (step ST6).

In the recognition dictionary update decision processing ST6, the recognition dictionary update deciding section 25 acquires the speed information indicating the traveling speed from the position/speed obtaining section 28 (speed acquisition: step ST7), and acquires the speed threshold from the threshold storing section 24 (step ST8). Then, comparing the speed information with the speed threshold, the recognition dictionary update deciding section 25 makes a decision as to whether the speed information is less than the speed threshold or not (step ST9).

For example, assuming that the speed threshold is 100 km/h, and when the speed information is 100 km/h or more, the recognition dictionary update deciding section 25 makes a decision as to whether the count value of a counter C, which counts the number of times the speed information exceeds 100 km/h, is two or more, for example (step ST10). When the count value of the counter C is less than two (that is, is one or less, or when the speed information becomes 100 km/h for the first time), the recognition dictionary update deciding section 25 increments the counter C by "1" (step ST11), and returns to step ST1.

On the other hand, if the speed information<the speed threshold at step ST9 or the count value of the counter C≧2, the recognition dictionary update deciding section 25 gives the recognition dictionary update instruction to the recognition dictionary update section 26. Acquiring the broadcasting station name from the station name obtaining section 23 (step ST12), the recognition dictionary update section 26 carries out the dictionary update by registering the broadcasting station name in the recognition dictionary 30 (step ST13).

When giving the recognition dictionary update instruction, the recognition dictionary update deciding section 25 provides the recognition dictionary update section 26 with the current vehicle location (position information) acquired from the position/speed obtaining section 28, the date and time (time information) acquired from the time measuring section 29, and the received field strength acquired from the field-strength obtaining section 21. The recognition dictionary update section 26 stores the position information, the time information, the received field strength, and the broadcasting station name in the update information storing section 22 as the update history (step ST14), and completes the processing.

Figure 6:
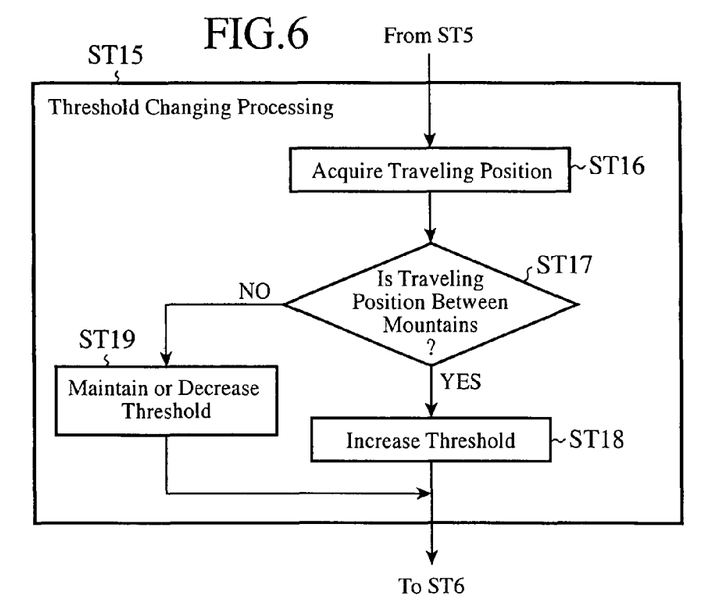
FIG. 6 is a flowchart illustrating the threshold changing processing applied to the flowchart shown in FIG. 5.

Incidentally, before performing the above-mentioned recognition dictionary update decision processing ST6, the threshold changing processing ST15 as illustrated in FIG. 6 can be executed. When the recognition dictionary update deciding section 25 obtains the current position where the vehicle is traveling from the position/speed obtaining section 28 (step ST16), it makes a decision referring to a map as to whether the current position is a location where radio wave conditions change frequently as in a place between mountains or not (whether the traveling position is a place between mountains: step ST17).

If the current position is a location where the radio wave conditions change frequently as in the place between mountains, the recognition dictionary update deciding section 25 increases the threshold (speed threshold, distance threshold, or time period threshold) stored in the threshold storing section 24 (step ST18). In contrast, unless the current position is a location where the radio wave conditions change frequently as in the place between mountains, the recognition dictionary update deciding section 25 maintains or reduces the threshold stored in the threshold storing section 24 (step ST19).

As described above, the present embodiment 1 is configured in such a manner that when the receiving broadcasting station changes, it decides whether to update the recognition dictionary or not considering the vehicle speed, that is, it alters the update frequency of the recognition dictionary considering the vehicle speed. Accordingly, the present embodiment 1 offers an advantage of being able to implement the stable operation with preventing the frequent update of the recognition dictionary and with reducing the load on the microcomputer.

In addition, the present embodiment 1 is configured in such a manner as to alter the threshold in accordance with the radio wave conditions. Accordingly, the present embodiment 1 offers an advantage of being able to implement the stable operation with preventing the frequent update of the recognition dictionary and with reducing the load on the microcomputer by increasing the threshold when the vehicle is traveling in a location where the receiving conditions vary frequently.

Embodiment 2

As the distance the vehicle travels increases after the digital broadcast wave becomes receivable, the reception of the digital broadcast wave can be considered to be more stable. Thus, according to the traveled distance after the update of (that is, addition to) the recognition dictionary 30, the update frequency can be altered.

Figure 7:
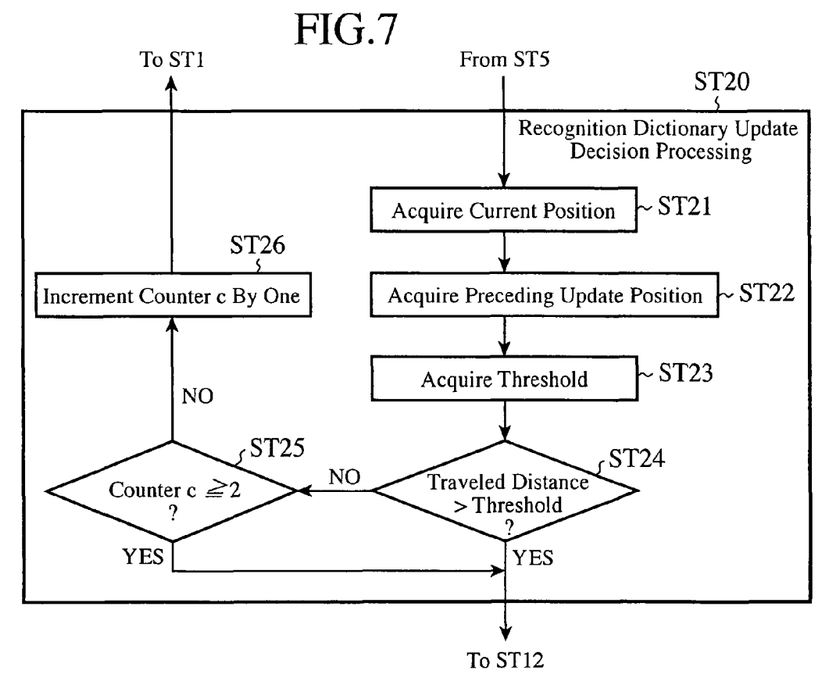
FIG. 7 is a diagram illustrating another example of the recognition dictionary update decision processing illustrated in FIG. 5 as an embodiment 2.

With reference to FIG. 1 and FIG. 7, in the flowchart as shown in FIG. 7, the recognition dictionary update decision processing ST20 is carried out which differs from the recognition dictionary update decision processing ST6 in the flowchart as shown in FIG. 5. In the recognition dictionary update decision processing ST20, the recognition dictionary update deciding section 25 acquires from the position/speed obtaining section 28 the current position indicating the current location (position) of the vehicle (current position acquisition: step ST21); and acquires from the update information storing section 22 the update position indicating the position at which the preceding update is performed (step ST22). In addition, the recognition dictionary update deciding section 25 acquires the distance threshold from the threshold storing section 24 (step ST23); compares the traveled distance obtained from the current position and the update position with the distance threshold; and makes a decision as to whether the traveled distance is greater than the distance threshold (step ST24).

For example, assume that the distance threshold is 500 m. If the traveled distance is 500 m or less, as for the count value of the counter C that counts the number of times the traveled distance becomes 500 m or less, a decision is made whether it is equal to or less than two, for example (step ST25). If the count value of the counter C is less than two (that is, one or less: or the traveled distance becomes 500 m or less for the first time), the recognition dictionary update deciding section 25 increments the counter C by "1" (step ST26), and returns the processing to step ST1 (FIG. 5).

On the other hand, if the traveled distance>the distance threshold at step ST24 or the count value of the counter C≧2, the recognition dictionary update deciding section 25 gives the recognition dictionary update instruction to the recognition dictionary update section 26 so that the processing at step ST12 and on of FIG. 5 is executed.

Figure 8:
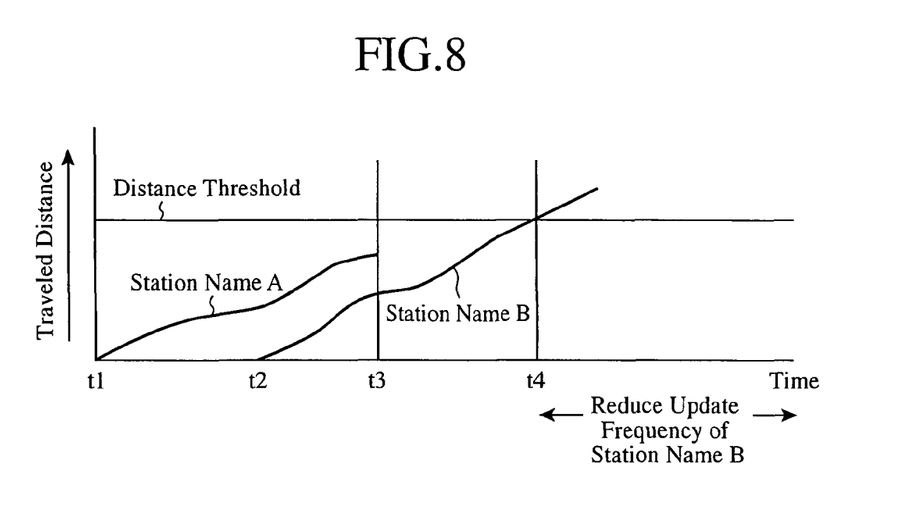
FIG. 8 is a diagram illustrating relationships between a traveled distance and a distance threshold and an update frequency when using the recognition dictionary update decision processing as shown in FIG. 7.

As illustrated in FIG. 8, assume that the recognition dictionary update processing is carried out: at time t1, the broadcasting station name A is added to the recognition dictionary 30; at time t2, the broadcasting station name B is added to the recognition dictionary 30; and at time t3, the broadcasting station name A is deleted from the recognition dictionary 30. After adding the broadcasting station name B, if the traveled distance of the vehicle exceeds the distance threshold at time t4, the update frequency is reduced as to the broadcasting station name B.

As described above, the present embodiment 2 is configured in such a manner as to make a decision, when the receiving broadcasting station changes, whether the recognition dictionary is to be updated or not considering the traveled distance of the vehicle. As the traveling distance from the start of reception to the end of the receivable state is longer, the receiving state can be considered to be more stable. Accordingly, the present embodiment 2 offers an advantage of being able to implement the stable operation with preventing the frequent update of the recognition dictionary by inhibiting immediate update of the recognition dictionary at a temporary unreceivable condition.

Embodiment 3

As the receiving time period increases after the digital broadcast wave becomes receivable, the reception of the digital broadcast wave can be considered to be more stable. Thus, the update frequency can be altered according to the receiving time period after the update of (that is, addition to) the recognition dictionary 30.

Figure 9:
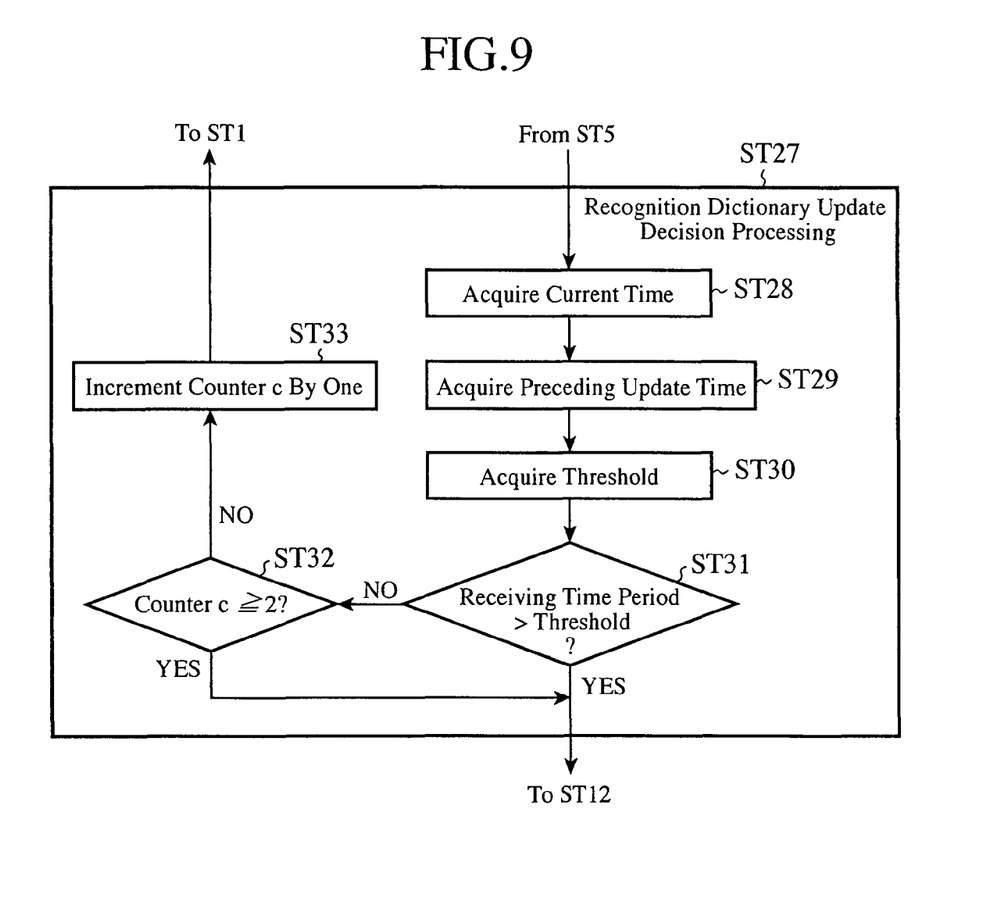
FIG. 9 is a diagram illustrating another example of the recognition dictionary update decision processing illustrated in FIG. 5 as an embodiment 3.

With reference to FIG. 1 and FIG. 9, in the flowchart as shown in FIG. 9, the recognition dictionary update decision processing ST27 is carried out which differs from the recognition dictionary update decision processing ST6 in the flowchart as shown in FIG. 5. In the recognition dictionary update decision processing ST27, the recognition dictionary update deciding section 25 acquires the current time (date and time) from the time measuring section 29 (step ST28), and acquires the update time at which the preceding update is performed from the update information storing section 22 (step ST29). In addition, the recognition dictionary update section 25 acquires the time period threshold from the threshold storing section 24 (step ST30), compares the receiving time period obtained from the current time and the update time with the time period threshold, and makes a decision as to whether the receiving time period is longer than the time period threshold (step ST31).

For example, assume that the time period threshold is 30 seconds. If the receiving time period is 30 seconds or less, as for the count value of the counter C that counts the number of times the receiving time period becomes 30 seconds or less, a decision is made whether it is equal to or less than two, for example (step ST32). If the count value of the counter C is less than two (that is, one or less: or the receiving time period becomes 30 seconds or less for the first time), the recognition dictionary update deciding section 25 increments the counter C by "1" (step ST33), and returns the processing to step ST1 (FIG. 5).

On the other hand, if the receiving time period>time period threshold at step ST31 or the count value of the counter C≧2, the recognition dictionary update deciding section 25 gives the recognition dictionary update instruction to the recognition dictionary update section 26 so that the processing at step ST12 and on of FIG. 5 is executed.

Figure 10:
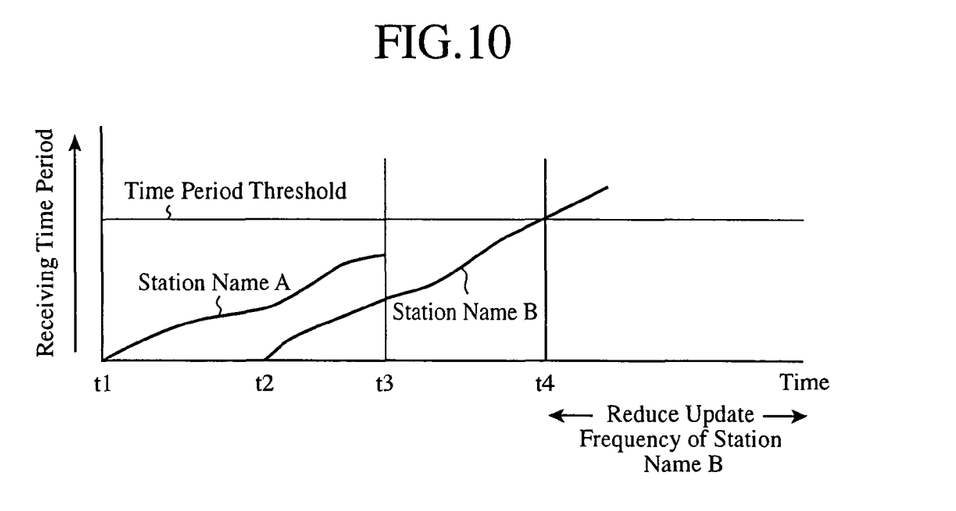
FIG. 10 is a diagram illustrating relationships between a receiving time period and a time period threshold and an update frequency when using the recognition dictionary update decision processing as shown in FIG. 9.

As illustrated in FIG. 10, assume that the recognition dictionary update processing is carried out: at time t1, the broadcasting station name A is added to the recognition dictionary 30; at time t2, the broadcasting station name B is added to the recognition dictionary 30; and at time t3, the broadcasting station name A is deleted from the recognition dictionary 30. After the broadcasting station name B is added, if the receiving time period of the broadcasting station B exceeds the time period threshold at time t4, the update frequency is reduced as to the broadcasting station name B.

As described above, the present embodiment 3 is configured in such a manner that it makes a decision, when the receiving broadcasting station changes, as to whether the recognition dictionary is to be updated or not considering the receiving time period. As the receiving time period from the start of reception to the end of the receivable state is longer, the receiving state can be considered to be more stable. Accordingly, the present embodiment 3 offers an advantage of being able to implement the stable operation with preventing the frequent update of the recognition dictionary by inhibiting the immediate update of the recognition dictionary in a temporary unreceivable condition.

Embodiment 4

Figure 11:
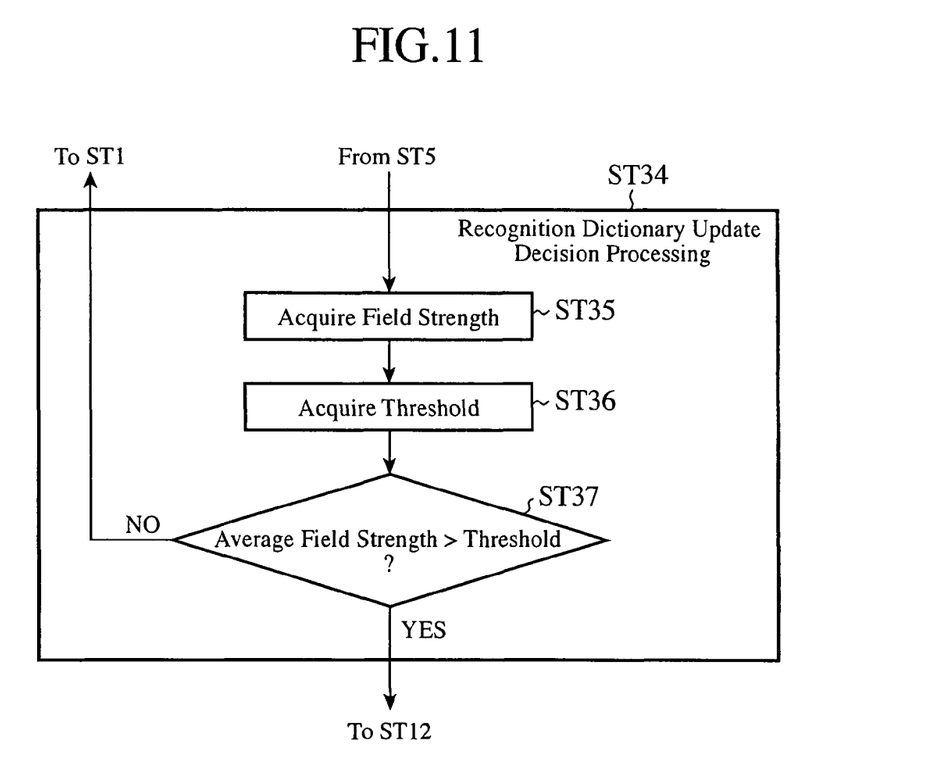
FIG. 11 is a diagram illustrating another example of the recognition dictionary update decision processing illustrated in FIG. 5 as an embodiment 4.

With reference to FIG. 1 and FIG. 11, in the flowchart as shown in FIG. 11, the recognition dictionary update decision processing ST34 which differs from the recognition dictionary update decision processing ST6 in the flowchart of FIG. 5 is carried out. In the recognition dictionary update decision processing ST34, the recognition dictionary update deciding section 25 acquires from the field-strength obtaining section 21 the received field strength associated with the digital broadcast wave from a receivable broadcasting station (step ST35), acquires the field-strength threshold from the threshold storing section 24 (step ST36), and makes a decision as to whether the average received field strength of each broadcasting station reduces or not.

More specifically, the recognition dictionary update deciding section 25 compares the average electric field strength, the average value of the received field strengths of the individual broadcasting stations, with the field-strength threshold, and makes a decision as to whether the average electric field strength is greater than the field-strength threshold or not (step ST37). Although not shown in FIG. 11, if the average electric field strength is equal to or less than the field-strength threshold, as for the count value of the counter C that counts the number of times the average electric field strength becomes the field-strength threshold or less, a decision is made as to whether it is equal to or less than two. If the count value of the counter C is less than two (that is, one or less: or the average electric field strength becomes equal to or less than the field-strength threshold for the first time), the recognition dictionary update deciding section 25 increments the counter C by "1", and returns the processing to step ST1 (FIG. 5).

In contrast, if the average electric field strength>field-strength threshold at step ST37 or the count value of the counter C≧2, the recognition dictionary update deciding section 25 gives the recognition dictionary update instruction to the recognition dictionary update section 26 so that the processing at step ST12 and on of FIG. 5 is executed.

Figure 12:
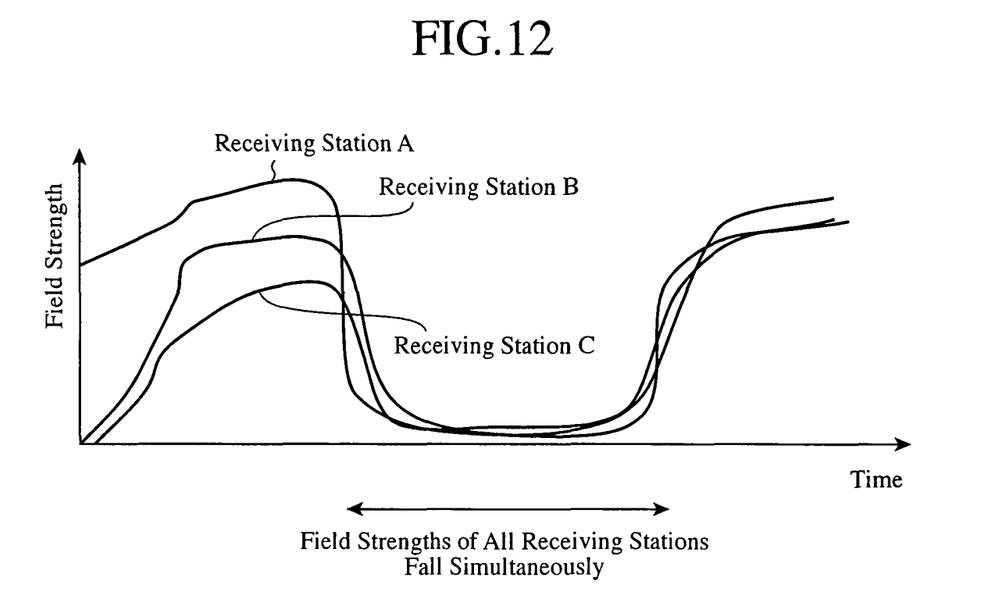
FIG. 12 is a diagram illustrating relationships between an average electric field strength and an update frequency when using the recognition dictionary update decision processing as shown in FIG. 11.

As illustrated in FIG. 12, assume that the broadcasting station A, broadcasting station B and broadcasting station C are receivable, and the received field strengths of all the broadcasting stations A-C fall simultaneously. In this case, the update of the recognition dictionary is not carried out for the broadcasting stations A-C until the received field strengths vary (that is, the average electric field strength exceeds the field-strength threshold), thereby reducing the update frequency of the broadcasting station names A-C.

As described above, the present embodiment 4 is configured in such a manner that it makes a decision, when the receiving broadcasting station changes, as to whether the recognition dictionary is to be updated or not considering the received field strengths associated with all the receivable broadcasting stations. Thus, when the received field strengths of a plurality of broadcasting stations fall simultaneously at about the same degree, the vehicle can be considered to be traveling in a particular region that blocks the radio waves (such as in a tunnel). Accordingly, the present embodiment offers an advantage of being able to implement the stable operation with reducing the load on the microcomputer as a result of preventing the unnecessary update of the recognition dictionary caused by the traveling spot of the vehicle.

Embodiment 5

Figure 13:
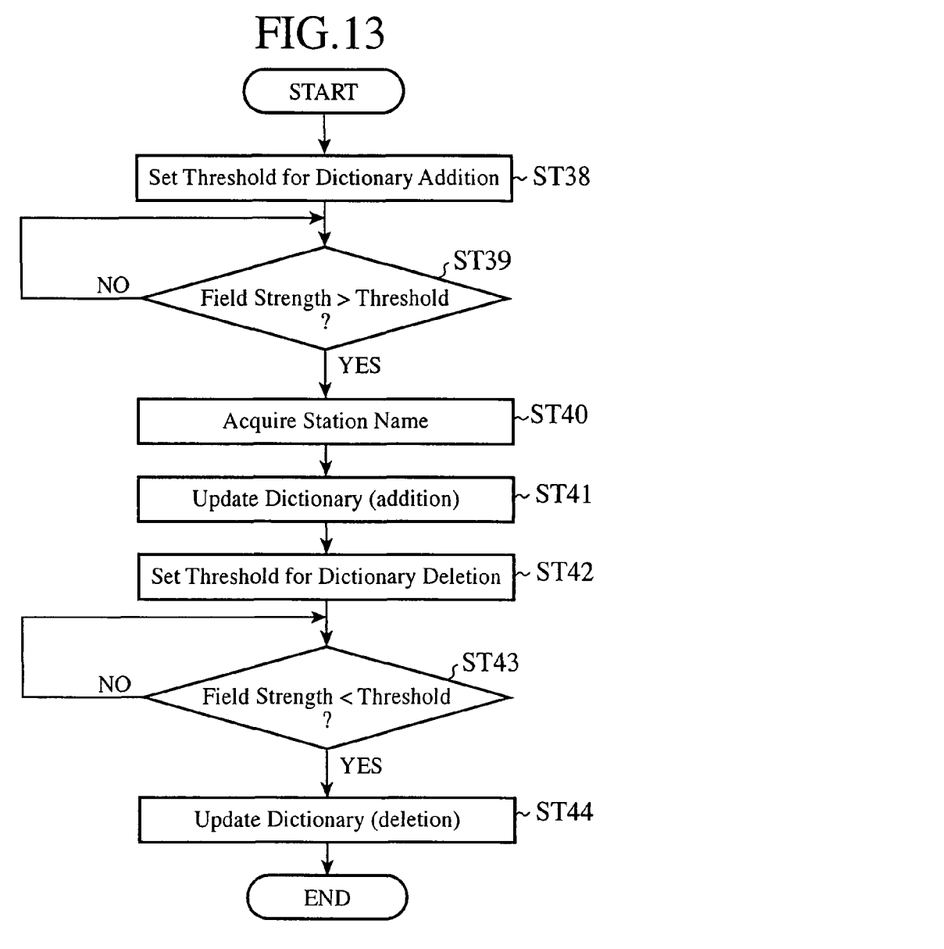
FIG. 13 is a flowchart illustrating the operation of the onboard information apparatus of an embodiment 5 in accordance with the present invention.

With reference to FIG. 1 and FIG. 13, here are set first and second field-strength thresholds as the field-strength threshold. The first field-strength threshold is a field-strength threshold used when adding a broadcasting station name to the recognition dictionary 30; and the second field-strength threshold is a field-strength threshold used when deleting a broadcasting station name from the recognition dictionary 30, where first field-strength threshold>second field-strength threshold.

Setting the first field-strength threshold (threshold setting for dictionary addition: step ST38), the recognition dictionary update deciding section 25 makes a decision as to whether the received field strength obtained from the field-strength obtaining section 21 exceeds the first field-strength threshold or not (step ST39). If the received field strength exceeds the first field-strength threshold, the recognition dictionary update deciding section 25 gives the recognition dictionary update instruction to the recognition dictionary update section 26. Thus, the recognition dictionary update section 26 acquires broadcasting station name from the station name obtaining section 23 (step ST40), and carries out the update processing of (addition to) the recognition dictionary 30 (step ST41).

Subsequently, setting the second field-strength threshold (threshold setting for dictionary deletion: step ST42), the recognition dictionary update deciding section 25 makes a decision as to whether the received field strength obtained from the field-strength obtaining section 21 exceeds the second field-strength threshold (step ST43). If the received field strength becomes less than the second field-strength threshold, the recognition dictionary update deciding section 25 gives the recognition dictionary update instruction to the recognition dictionary update section 26. Thus, the recognition dictionary update section 26 carries out the update processing of (deletion from) the recognition dictionary 30 (step ST44).

Figure 14:
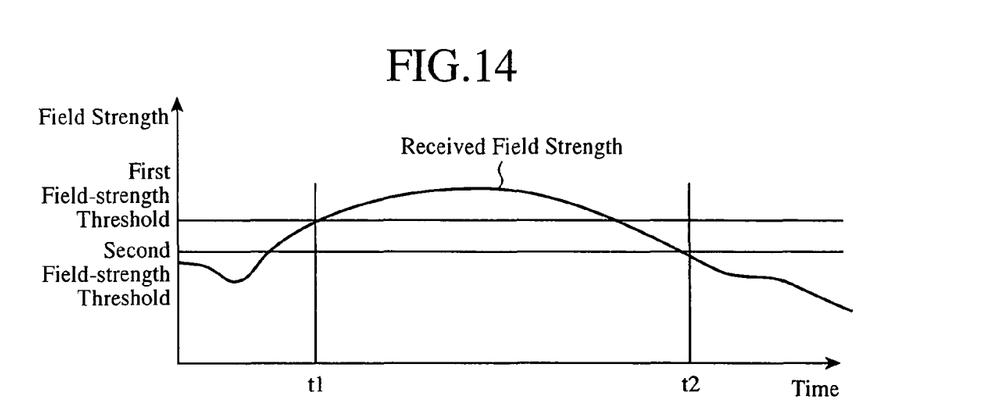
FIG. 14 is a diagram illustrating addition to and deletion from the recognition dictionary when carrying out the operation as illustrated in FIG. 13.

As a result, as illustrated in FIG. 14, when the received field strength exceeds the first field-strength threshold at time t1, the broadcasting station is added to the recognition dictionary. In contrast, when the received field strength becomes less than the second received field strength lower than the first field-strength threshold at time t2, the broadcasting station is deleted from the recognition dictionary. In this way, the broadcasting station name that has been once registered in (added to) the recognition dictionary 30 remains in the recognition dictionary 30 for a longer time, thereby being able to prevent the frequent update of the recognition dictionary.

As described above, the present embodiment 5 is configured in such a manner that it sets the field-strength threshold for adding the broadcasting station to the recognition dictionary at a value greater than the field-strength threshold for deleting the broadcasting station from the recognition dictionary. Thus, as for the broadcasting station that has once become receivable, even if its receiving state deteriorates to some extent, the deletion thereof from the recognition dictionary can be prevented. As a result, the present embodiment 5 offers an advantage of being able to implement the stable operation with reducing the load on the microcomputer by preventing the frequent update of the recognition dictionary.

Embodiment 6

Figure 15:
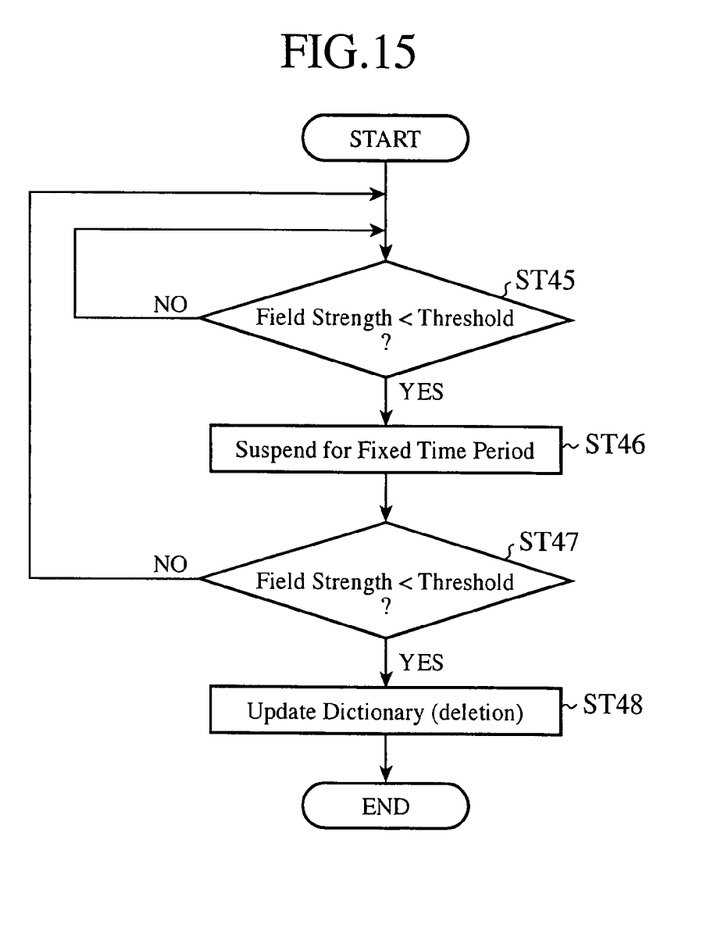
FIG. 15 is a flowchart illustrating the operation of the onboard information apparatus of an embodiment 6 in accordance with the present invention.

With reference to FIG. 1 and FIG. 15, the recognition dictionary update deciding section 25 makes a decision as to whether the received field strength acquired from the field-strength obtaining section 21 becomes less than the field-strength threshold or not (step ST45). In other words, it makes a decision as to whether an unreceivable condition occurs or not. If the received field strength becomes less than the field-strength threshold, after a predetermined time is counted (fixed time suspension: step ST46), the recognition dictionary update deciding section 25 makes a decision as to whether the received field strength is less than the field-strength threshold, again (step ST47).

If the received field strength is less than the field-strength threshold, the recognition dictionary update deciding section 25 gives the recognition dictionary update instruction to the recognition dictionary update section 26. Thus, the recognition dictionary update section 26 carries out the update processing of (deletion from) the recognition dictionary 30 (step ST48).

Figure 16:
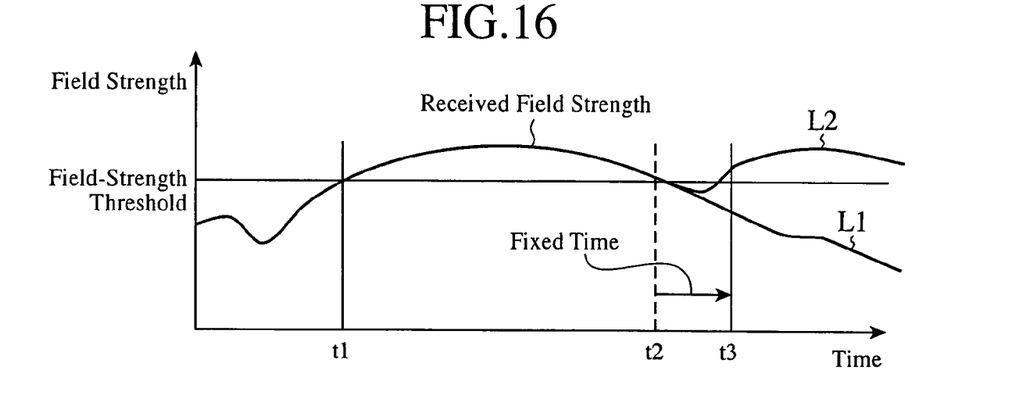
FIG. 16 is a diagram illustrating addition to and deletion from the recognition dictionary when carrying out the operation as illustrated in FIG. 15.

The deletion of the broadcasting station name in this way makes it possible to prevent the frequent update of the recognition dictionary as illustrated in FIG. 16. At time t1, the addition (dictionary update (addition)) of a broadcasting station name is carried out. At time t2, if the received field strength of the broadcasting station is less than the field-strength threshold, and at time t3 after a fixed time has elapsed, if the received field strength is also less than the field-strength threshold (the state shown by the curve L1 in FIG. 16), the broadcasting station name is deleted from the recognition dictionary 30. In contrast, at time t3, if the received field strength is equal to or greater than the field-strength threshold (the state shown by the curve L2 in FIG. 16), the broadcasting station name is not deleted from the recognition dictionary 30.

As described above, the present embodiment 6 is configured in such a manner as to preserve the broadcasting station, which has been once added to the recognition dictionary, in the recognition dictionary even if the received field strength falls and becomes less than the field-strength threshold, but is not less than the field-strength threshold after the fixed time has elapsed. Thus, the broadcasting station that has become receivable once is not deleted from the recognition dictionary because of the temporary deterioration of the receiving condition. As a result, the present embodiment 6 offers an advantage of being able to reduce the load on the microcomputer by preventing the frequent update of the recognition dictionary.

Embodiment 7

Figure 17:
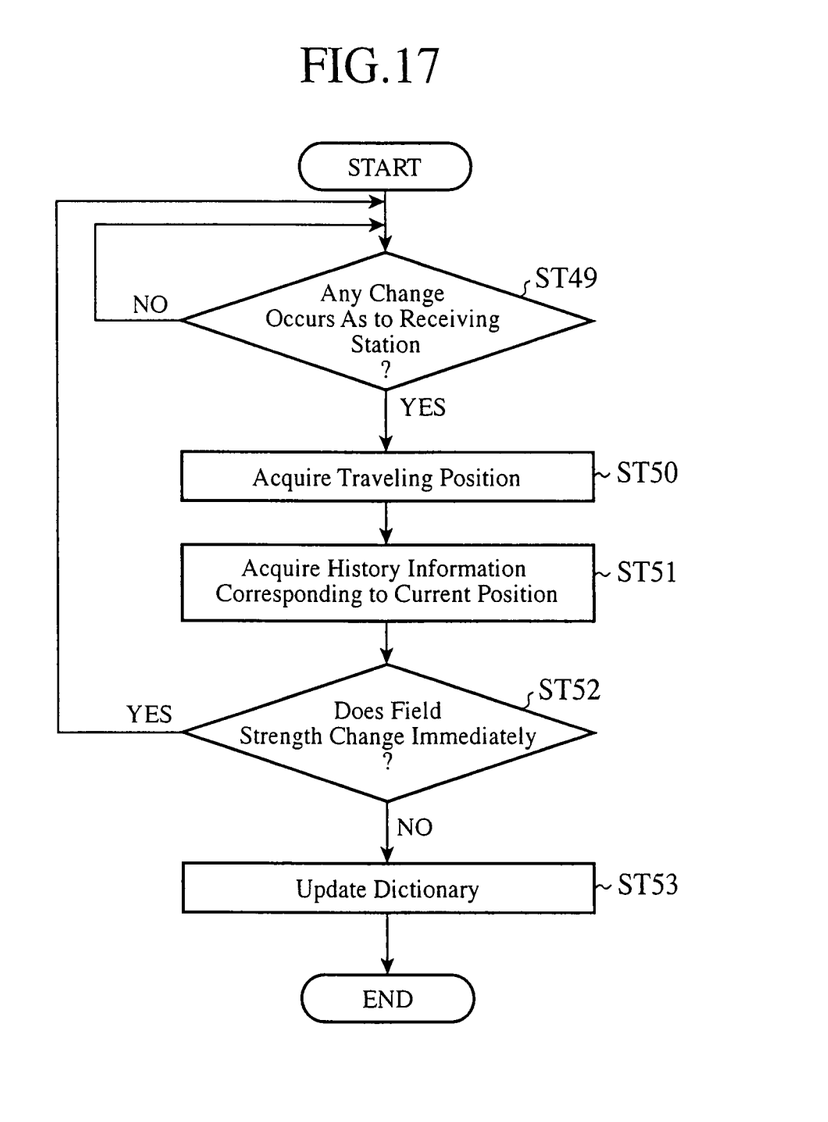
FIG. 17 is a flowchart illustrating the operation of the onboard information apparatus of an embodiment 7 in accordance with the present invention.

With reference to FIG. 1 and FIG. 17, the recognition dictionary update section 26 makes a decision as to whether the receiving broadcasting station changes or not from the broadcasting station name acquired from the station name obtaining section 23 (step ST49). If the receiving broadcasting station changes, it notifies the recognition dictionary update deciding section 25 of the change. Then, the recognition dictionary update deciding section 25 acquires the current position of the vehicle from the position/speed obtaining section 28 (step ST50), searches the update information storing section 22 in accordance with the current position, and acquires the update history information corresponding to the current position (step ST51).

After that, according to the update history information, the recognition dictionary update deciding section 25 makes a decision as to whether the received field strength associated with the receiving broadcasting station changes immediately or not (step ST52). In the case where the received field strength changes promptly, the recognition dictionary update deciding section 25 returns the processing to step ST49 without providing the update processing instruction to the recognition dictionary update section 26. In contrast, unless a decision is made that the received field strength changes immediately, the recognition dictionary update deciding section 25 gives the update processing instruction to the recognition dictionary update section 26. Thus, the recognition dictionary update section 26 carries out the update processing of the recognition dictionary 30 (step ST53).

As described above, the present embodiment 7 is configured in such a manner that it carries out the update processing of the recognition dictionary with considering the update history information. Thus, it can decide before the update of the recognition dictionary as to the case where the receivable condition occurs immediately after the unreceivable state, or the unreceivable condition follows promptly even if the receivable state takes place. Accordingly, the present embodiment 7 offers an advantage of being able to reduce the load on the microcomputer by preventing the frequent update of the recognition dictionary.

As is clear from the foregoing description, the receiving section 11 and the radio/TV unit 13 constitute a broadcast receiver, and the position/speed obtaining section 28 functions as a speed obtaining section and a current location obtaining section. In addition, the update information storing section functions as a history information storing section.

INDUSTRIAL APPLICABILITY

As described above, the present invention is widely applicable to the information apparatus for use in mobile unit, which is used as a navigation system and the like.

What is claimed is:

1. An information apparatus for use in mobile unit, which includes a broadcast receiver mounted on a mobile unit for receiving a broadcasting signal containing at least a broadcasting station name, a dictionary registering the broadcasting station name, and a recognition section which carries out, referring to the dictionary, tuning to the broadcasting station associated with the broadcasting station name, said information apparatus for use in mobile unit comprising:

a dictionary update section for updating the dictionary in response to reception of the broadcasting signal, where said update section has an update frequency, which determines how often to update said dictionary in a given time period; and a dictionary update deciding section
for deciding, based on an update mode during said updating, whether any change occurs between the broadcasting station transmitting the broadcasting signal and the update mode or not, and
for calculating, if any change occurs, a new update frequency in response to a traveling condition of the mobile unit or to a receiving condition of the broadcasting signal.

2. The information apparatus for use in mobile unit according to claim 1, further comprising:
a speed obtaining section for acquiring traveling speed of said mobile unit as the traveling condition, wherein said dictionary update deciding section compares the traveling speed with a predetermined speed threshold, and calculates a new update frequency based on a result of said comparison.

3. The information apparatus for use in mobile unit according to claim 2, wherein said dictionary update deciding section varies the predetermined threshold in response to a current location of said mobile unit.

4. The information apparatus for use in mobile unit according to claim 1, further comprising:
a current location obtaining section for acquiring a current location of said mobile unit as the traveling condition, wherein
said dictionary update deciding section obtains a traveled distance of said mobile unit from the current location and a previously acquired location at which a preceding update of the dictionary was carried out, compares the traveled distance with a predetermined distance threshold, and alters thecalculates a new update frequency based on a result of said comparison.

5. The information apparatus for use in mobile unit according to claim 4, wherein said dictionary update deciding section varies the predetermined threshold in response to the current location of said mobile unit.

6. The information apparatus for use in mobile unit according to claim 1, further comprising:
a time measuring section for obtaining a current time as the traveling condition, wherein
said dictionary update deciding section obtains a receiving time period of the broadcasting signal from the current time and a previously obtained time at which a preceding update of the dictionary was carried out, compares the receiving time period with a predetermined time period threshold, and calculates a new update frequency based on a result of said comparison.

7. The information apparatus for use in mobile unit according to claim 6, wherein said dictionary update deciding section varies the predetermined threshold in response to a current location of said mobile unit.

8. The information apparatus for use in mobile unit according to claim 1, further comprising:
a field-strength obtaining section for acquiring received field strengths of a plurality of broadcasting signals, wherein
said dictionary update deciding section compares the received field strengths associated with the plurality of broadcasting signals with a predetermined field-strength threshold, and gives an instruction to said dictionary update section to suspend an update of the dictionary if an average received field strength of all the received field strengths is less than the field-strength threshold.

9. The information apparatus for use in mobile unit according to claim 1, further comprising:
a field-strength obtaining section for acquiring received field strength of the broadcasting signal as the receiving condition, wherein
said dictionary update deciding section instructs, if the received field strength exceeds a predetermined first field-strength threshold, said dictionary update section to add to the dictionary the broadcasting station name that transmits the broadcasting signal, and instructs, if the received field strength becomes less than a second predetermined field-strength threshold, which is smaller than the first field-strength threshold, said dictionary update section to delete from the dictionary the broadcasting station name that transmits the broadcasting signal.

10. The information apparatus for use in mobile unit according to claim 1, further comprising:
a field-strength obtaining section for acquiring received field strength of the broadcasting signal as the receiving condition, wherein
said dictionary update deciding section instructs said dictionary update section to delete from the dictionary the broadcasting station name that transmits the broadcasting signal if the received field strength becomes less than a predetermined field-strength threshold and is still below said threshold after a prescribed time period.

11. The information apparatus for use in mobile unit according to claim 1, further comprising:
a history information storing section for storing a relationship between a current location of said mobile unit and received field strength as history information;
a current location obtaining section for acquiring the current location of said mobile unit as the traveling condition; and
a field-strength obtaining section for acquiring the received field strength of the broadcasting signal as the receiving condition, wherein
said dictionary update deciding section, referring to the history information on a basis of the current location of said mobile unit, makes a decision as to whether to update the dictionary in response to the received field strength indicated by the history information.

12. The apparatus of claim 1, where the recognition section is a voice recognition section for performing voice recognition of a voice input indicating the broadcasting station name, and which carries out, referring to the dictionary, tuning to the broadcasting station associated with the broadcasting station name corresponding to a voice recognition result.

13. A method of updating a broadcast station dictionary in a mobile unit, which includes a broadcast receiver mounted on a mobile unit for receiving a broadcasting signal containing at least a broadcasting station name, the dictionary registering the broadcasting station name, and a recognition section which carries out, referring to the dictionary, tuning to the broadcasting station associated with the broadcasting station name, said method comprising:
determining an update mode of a dictionary update module, where said update module has an update frequency which determines a rate at which said update module updates said dictionary;
determining, based on identifying information extracted from said broadcasting signal and said update mode, any change in the broadcasting signal;
updating the dictionary with said update module based on said update mode and said identifying information;
calculating, based on said determined change, a new update frequency of the dictionary update module, wherein said determined change includes information representing at least one of a receiving condition of the broadcasting signal and a travel condition of the mobile device.

* * * * *